Figure 1:
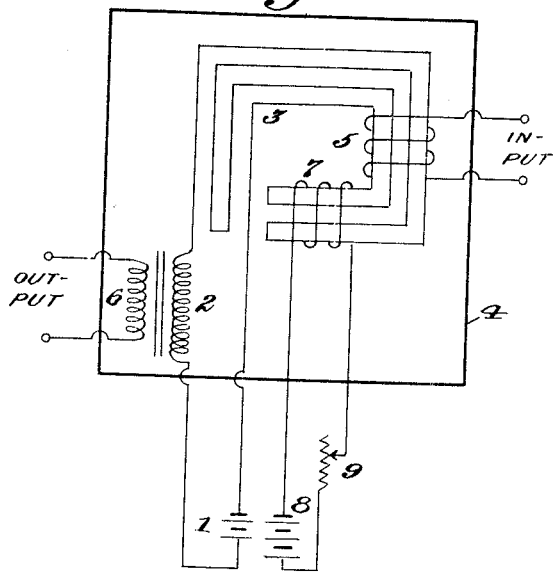

Feb. 20, 1934.

C. FICHANDLER 1,948,209

MAGNETORESISTIVE SYSTEM AND APPARATUS

Filed Oct. 5, 1931

Inventor:
Carl Fichandler
By Carl M. Cohen
Att'y.

Patented Feb. 20, 1934

1,948,209

UNITED STATES PATENT OFFICE 1,948,209

MAGNETORESISTIVE SYSTEM AND APPARATUS

Carl Fichandler, New York, N. Y.

Application October 5, 1931. Serial No. 567,123

4 Claims. (Cl. 250—36)

The present invention relates to electrical devices such as relays, amplifiers, and oscillators and more particularly, is concerned with the provision of such devices operable without moving parts or the use of ionic discharge devices, thermionic tubes and the like.

It is known that a number of conductors of electricity, mainly the ferro-magnetic metals, iron, nickel, cobalt, and the alloys thereof, change their electric resistivity, when subjected to a magnetic field. While these changes are small, the magnetic forces causing them are also minute. For example, it has been observed that the magnetic field of the earth is strong enough to saturate iron, as far as the magneto-resistive effect is concerned. If, therefore, a source of electrical intensity variations is arranged to produce current variation in an inductance, thereby varying the magnetic flux through a resistive electrical circuit element, then the resistance of said element will vary in proportion to the input variations. If said circuit element is connected to a source of constant electromotive force, such as a battery, then said resistance variations will produce in said circuit element current variations. If the apparatus is properly designed, the output variations possess more energy than the input variations, and the apparatus will therefore constitute an amplifier.

While the magneto-resistive effect, for very weak magnetic fields, increases more rapidly than the field, and for execssive fields, approaches a constant saturation value, there exists a fairly extensive range, in which change of resistance is proportional to change in magnetic flux, so that the amplifying action is free from amplitude distortion.

An amplifier may be built to intensify indiscriminately an extensive range of input variation frequencies, or, by insertion of resonant or frequency discriminative circuit elements, it may be made selective or "tuned".

If a sufficient part of the output energy is "fed back" into the input circuit in a manner known to the art, an electro-resistive amplifier may be caused to build up any small chance fluctuations into sustained oscillations of electrical intensity at a frequency determined by its circuit constants.

According to the present invention, magneto-resistive systems are provided for amplifying electrical intensity variations and for producing, amplifying, and maintaining electrical oscillations at a predetermined frequency. The provision of these systems and apparatus therefor constitute the primary objects of this invention.

A further object of the invention is generally to improve the electrical amplifier and oscillator art.

Figure 2:
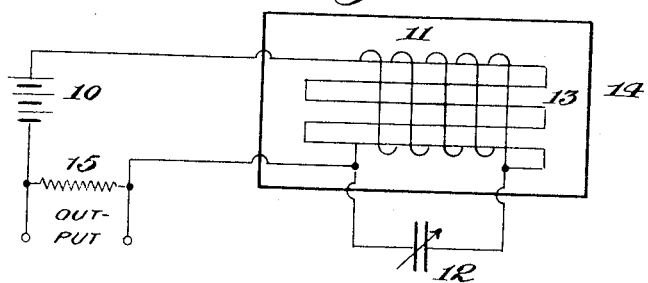

The invention will be explained in detail in the following description, reference being made to the accompanying drawing, in which:

Figure 1 is a more or less diagrammatic view of a magneto-resistive amplifier; and Figure 2 is a more or less diagrammatic view of a magneto-resistive oscillator.

Referring to Figure 1, a source of constant electro-motive force such as a battery 1, is connected in series with the primary 2 of an output transformer and with a magneto-resistive circuit element such as a winding 3 of high resistance wire, such as iron or other magneto-resistive metal. The winding 3 is preferably non-inductive and is therefore preferably wound bifilarly, as shown, whereby to reduce its inductance and to minimize its influence by stray fields. An iron casing 4, constituting a magnetic shield, provides further protection for the winding 3 against stray fields. The magnetizing coil 5, associated with the winding 3, constitutes the input and may be connected to a source of electrical intensity variations for amplification thereof by the present apparatus. A magnetic biasing coil 7, energized by a battery 8, controlled by an adjustable resistance 9, provides a constant component of magnetic flux which may be adjusted to such a value that the variations in resistance of the winding 3 caused by the magnetic effect of the input coil 5, are in substantially straight-line proportion to variations in flux, thereby providing undistorted amplification. The energy thus amplified may be transferred at the output through the medium of the secondary 6 of the output transformer. By coupling the output to the input the circuit here shown may constitute an oscillator circuit, the coupling circuit being preferably variably tuned.

The amplifier here shown may be combined with one or more similar amplifiers constituting successive amplifying stages, and/or said amplifier may be connected to thermionic tubes or other discharge devices and to known radio circuits including thermionic tubes or other discharge devices. Two circuits as shown in Figure 1 may be combined for push-pull action as an amplifier or oscillator. The circuit shown in Figure 1 may be employed for modulation, detecting, frequency doubling and other purposes known to the art by suitably adjusting the biasing resistance 9 whereby there is produced a maximum curvature in the magneto-resistive characteristic instead of the straight line characteristic.

The magneto-resistive oscillator, as here shown in Figure 2, comprises a battery 10 in a circuit including, in series, a tuned circuit constituted by a magnetizing inductance coil 11 in parallel with a condenser 12, a magneto-resistive circuit winding element 13, preferably bifilarly wound ferro-magnetic wire, and an output impedance 15. A shield, such as an iron casing 14, protects the winding 13 and the coil 11 against the action of stray fields. In this circuit, any chance fluctuation is built up to and maintained at a sustained oscillation of approximately the frequency of the tuned circuit containing the coil 11 and condenser 12.

While I have shown and described two embodiments of my invention, it will be understood that my invention is not limited to this disclosure and that I therefore do not wish to be limited to the specific systems and apparatus shown except as may be required by the appended claims and the prior art.

Having thus described my invention, what I claim is:

1. An oscillator comprising a magneto-resistive element, a source of electrical energy, and a tuned circuit in series with said source of energy and said magneto-resistive element comprising a winding arranged to magnetize said magneto-resistive element.

2. An oscillator comprising a magneto-resistive element, a source of electrical energy and a tuned circuit in series with said source of energy and said magneto-resistive element, the inductance winding of said tuned circuit arranged to magnetize said magneto-resistive element.

3. An oscillator comprising a magneto-resistive element, a source of electrical energy, and a tuned circuit in series with said source of energy and said magneto-resistive element comprising a winding arranged to magnetize said magneto-resistive element and a magnetic shield for said magneto-resistive element.

4. An oscillator comprising a non-inductive magneto-resistive element, a source of electrical energy, and a tuned circuit in series with said source of energy and said magneto-resistive element comprising a winding arranged to magnetize said magneto-resistive element.

CARL FICHANDLER.